United States Patent [19]
Arnold

[11] Patent Number: 5,239,520
[45] Date of Patent: Aug. 24, 1993

[54] BOOTING CIRCUIT ARRANGEMENT FOR A MICROPROCESSOR

[75] Inventor: Karl-Heinz Arnold, Georgensgmünd, Fed. Rep. of Germany

[73] Assignee: Robert Bosch GmbH, Stuttgart, Fed. Rep. of Germany

[21] Appl. No.: 687,866

[22] PCT Filed: Jul. 25, 1990

[86] PCT No.: PCT/DE90/00565
§ 371 Date: May 31, 1991
§ 102(e) Date: May 31, 1991

[87] PCT Pub. No.: WO91/02303
PCT Pub. Date: Feb. 21, 1991

[30] Foreign Application Priority Data

Aug. 8, 1989 [DE] Fed. Rep. of Germany ....... 3926178

[51] Int. Cl.$^5$ .................. G04B 47/00; B60Q 1/00; G06F 1/00
[52] U.S. Cl. .................. 368/10; 307/10.1; 395/550
[58] Field of Search .................. 368/10, 107, 113; 307/10 R, 10 LS, 115, 116; 340/438, 439; 364/707, 200, 900

[56] References Cited

U.S. PATENT DOCUMENTS

| | | | |
|---|---|---|---|
| 4,455,623 | 6/1984 | Wesemeyer et al. | 364/900 |
| 4,658,150 | 4/1987 | Mizuno et al. | 307/10 R |
| 4,677,308 | 6/1987 | Wroblewski et al. | 307/10 R |
| 4,839,530 | 6/1989 | Greenwood | 307/10.1 |

OTHER PUBLICATIONS

Motorola Handbook "Microprocessor, Microcontroller, and Peripheral Data—vol. 1", 1988, pp. iii, 1-1, 1-2, and 3-393 through 3-396, describing the MC68HC04P4 Microcontroller.

Pentti Lappalainen, "A High-Performance Monostable Multivibrator," IEEE Journal of Solid-State Circuits, Aug. 1974, vol. SC-9, No. 4, pp. 190-192.

B. Spedding, "Monostable Applied to Low Power Systems," Electronic Engineering, vol. 59, No. 732, p. 27, (Dec. 1987).

WPI Abstract of German DE-3926178 of Feb. 14, 1991.

*Primary Examiner*—Vit W. Miska
*Attorney, Agent, or Firm*—Frishauf, Holtz, Goodman & Woodward

[57] ABSTRACT

In a booting circuit arrangement for a microprocessor ($\mu$C) controlling electrical devices, particularly of a motor vehicle, wherein peripheral components (15, 17) of the microprocessor ($\mu$C) can be turned off by a voltage supply arrangement (7), and the microprocessor ($\mu$C) can be put into an idle or stop mode, and wherein the microprocessor ($\mu$C) can be put back into its operating mode from this mode by an external switching signal for running an existing program, in that the external control signal actuates an electronic booting circuit (20, 20') associated with the microprocessor ($\mu$C), it is provided, in order to attain a functionally reliable switchover of the microprocessor ($\mu$C) regardless of the type and duration of the control signal, that the switching signals reach a timing stage (C1, R8, IC1) in the form of potential jumps, the output (23) of the timing stage switching a pulse (25) of defined length to the interrupt input ($\overline{INT}$) of the microprocessor ($\mu$C), with which pulse the microprocessor ($\mu$C) leaves the idle or stop mode and turns on the voltage supply arrangement (7) for the peripheral components (15, 17).

6 Claims, 2 Drawing Sheets

BOOTING CIRCUIT ARRANGEMENT FOR A MICROPROCESSOR

FIELD OF THE INVENTION

The invention is directed to a booting or wake-up circuit for a microprocessor.

BACKGROUND

A circuit arrangement of this kind is known from German Patent 29 11 998 and corresponding WESEMEYER et al. U.S. Pat. No. 4,455,623.

Booting circuits of this kind are necessary, particularly in motor vehicles, so that the microprocessor and its peripherals are not continuously connected to the vehicle battery in the operating mode, thus discharging the battery if the vehicle is stopped for a relatively long period. On the other hand, even when the vehicle is shut off for such long times, the microprocessor must not be switched off completely, since various functions, such as tripping of the vehicle alarm system, or electric door locking can be kept operative only if they are generally controlled via the microprocessor. Similar problems generally arise in all battery-operated microprocessor systems that must trigger function processes from the state of repose.

THE INVENTION

The object of the is to develop a generic circuit referred to at the outset further in such a way that when arbitrarily many and/or different switches are triggered, or when a bus control signal is applied to a control input of the circuit arrangement, a defined signal for the microprocessor is generated.

The thus-provided triggering of he interrupt input of the microprocessor, in particular a CMOS microprocessor, makes it possible by means of the booting circuit, via an arbitrary number of key switches, to change the microprocessor from an idling or stop mode previously achieved by software into an operating mode (BOOTING).

By means of the microprocessor, a switchable voltage regulator of a voltage supply arrangement for supplying peripherals can be switched on, and it is possible to have the microprocessor run through the particular program called up by the interrupt command and in this process to read in data from a controller network, evaluate the data, and trigger the appropriate output drivers. As soon as there are no further activities occurring at the inputs and outputs of the microprocessor, this situation is recognized by the microprocessor via software and processed in such a way that after a predetermined period of time the microprocessor automatically switches back to the idle or stop mode.

Accordingly, when a motor vehicle is turned off, only the booting circuit arrangement and the microprocessor are supplied with a voltage in the standby mode, and the microprocessor itself is put in the idle or stop mode. The power takeup of the multiplex station can accordingly be reduced to a minimum by shutting off the peripherals.

With the further feature of the timer stage defined by claim 2 it is assured that the interrupt input of the microprocessor always receives a defined HIGH or LOW signal by means of the command value switch preceding it.

By means of the embodiment of claim 3 it is attained that the switching pulse for the microprocessor interrupt input has an adequate, defined length even if the trigger signal itself is only very brief or is composed of a plurality of very brief signals, for instance because of switch bounce.

According to claim 4 it is possible, by actuating a key switch, to trigger the microprocessor interrupt input and accordingly put the microprocessor in the operating mode even if some other key switch is in a permanently closed state; for instance, tripping of the alarm system is possible even if the switch associated with the central locking system is in a closed state.

By means of the embodiment of claim 5 it is possible to effect triggering of the interrupt input not only by the closure of a key switch but also by opening a certain key switch with a corresponding circuit arrangement connected to the output side.

The embodiment of claim 6 makes it possible to trigger the booting circuit, which in principle is suitable for this purpose because of the characteristics described above, by a bus activity, in other words whenever a second station is sending a data telegram.

BRIEF FIGURE DESCRIPTION

The invention will be described in detail below in terms of preferred exemplary embodiments in conjunction with the drawing. Shown are:

FIG. 1, a schematic view of the essential parts of a circuit arrangement according to the invention, used in a motor vehicle multiplex system; and FIG. 2, a variant of the booting circuit arrangement shown in FIG. 1.

DETAILED DESCRIPTION

Figure 1:
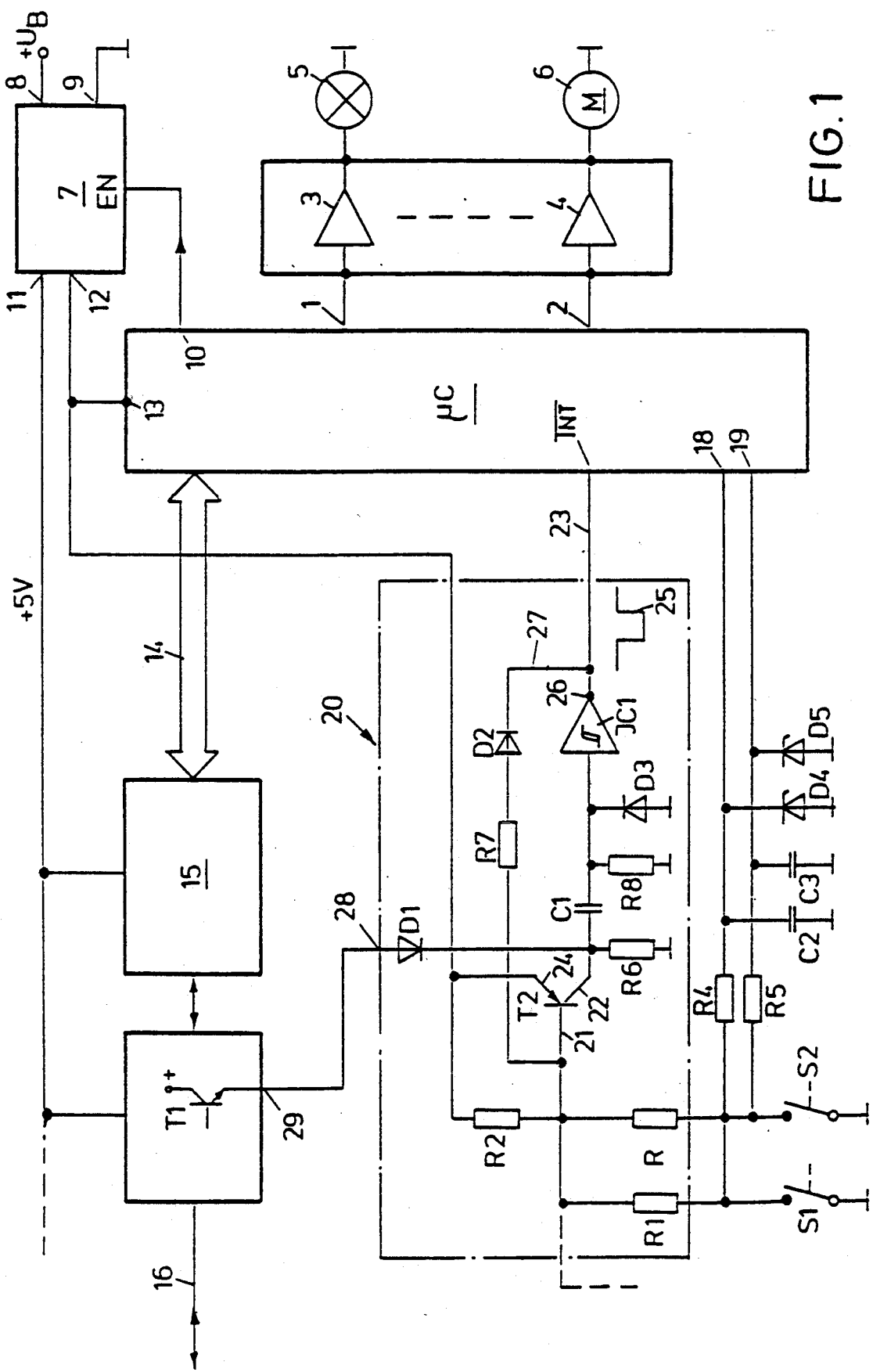

In FIG. 1, a microprocessor $\mu C$ for one of a plurality of multiplex stations in the motor vehicle is shown, which triggers electrical devices 5, 6 via driver stages 3, 4 connected to the output side of the outputs 1, 2. As a rule, a number of such electrical devices in the motor vehicle are each triggered by one multiplex station. In FIG. 1, for the sake of simplicity, only two of them are shown, for a station for a motor vehicle door, for instance.

The microprocessor $\mu C$ is supplied with power via a voltage regulating arrangement 7, which is connected to the positive operating voltage $+U_B$ via an input 8 and to ground via an input 9 and is triggered via the enable input by the output 10 of the microprocessor $\mu C$. The voltage supply arrangement 7 has an output 11, at which a voltage of $+5$ V for supplying peripheral components is applied in such a manner that it can be switched off, and an output 12, at which a voltage of $+5$ V is permanently applied, and which supplies the microprocessor continuously via an input 13 of the microprocessor.

The microprocessor $\mu C$ sends data to further stations via a data bus 14 and a controller network 15 and via a bus driver/receiver arrangement 17 to a multiplex bus line 16, and receives data over the opposite route.

In the case of use in a motor vehicle, a plurality of key switches S1, S2 . . . may be provided, with the key switch SI for instance being associated with the central locking system and the key switch S2 being associated with the alarm system.

When the microprocessor $\mu C$ is in the normal (booted) operating mode, it triggers the enable input EN of the voltage supply arrangement 7, via the output 10, so that the peripheral components 15 and 17 are supplied with voltage via the output 11 of this arrangement 7. The switch states of the key switches S1, S2 . . . are also read in via the read-in lines or read-in inputs 18, 19, having the capacitors C2 and C3, respectively, connected to ground and diodes D4 and D5, respectively, connected to ground and the series-connected resistors R4 and R5, respectively. Data on the data bus are also read in or output in accordance with the program to be run.

In order to return the microprocessor μC to an operating mode whenever it is in an idle or stop mode, for instance after the ignition key has been withdrawn, a booting circuit 20 and 20¹ (FIGS. 1 and 2, respectively) is provided.

This booting circuit includes a switch transistor T2, which switches switch pulses of the keys S1, S2 from its base 21 to the collector 22 and via it from the output 23 to the inverting interrupt input $\overline{INT}$ of the microprocessor μC, via resistors R1, R2 connected to the output side of these keys S1, S2, whenever the control signal at the base 21 drops below the switch threshold defined by the base-to-emitter resistor R2. The emitter 24 of the transistor T2 is connected directly to the operating voltage of +5 V applied constantly to the output 12 of the voltage supply arrangement 7, and the base is connected to the output 12 via the resistor R2.

To attain a switch signal 25 that is adequate in its width to trigger or actuate the interrupt input INT, the collector 22 of the transistor T2, which is connected to ground, via a resistor R6, is followed by a capacitor C1, which is charged via a further resistor R8 connected to ground; the capacitor C1 is followed by an inverter IC1 embodied as a Schmitt trigger (threshold value switch), and its output 26 is followed by the interrupt input INT. A diode D3 is connected parallel in the blocking direction to the charging resistor R8.

The series circuit comprising the capacitor C1 and the resistor R8 acts as a differentiation element with respect to voltage changes at the collector 22 of the switch transistor T2; that is, if the voltage at the collector 22 is increased as a result of a control pulse from the keys S1, S2, the capacitor C1 is first charged via R8 and then is discharged, with the switch transistor T2 blocked, via the resistor R6 and the diode D3. At a voltage $U_{B/2}$, the switch threshold of the Schmitt trigger of the inverter IC1 is exceeded, for example, so that from the positive +5 Volt signal at the input side, a LOW signal is generated at the output 26 of the inverter IC1, which signal acts upon the interrupt input $\overline{INT}$ of the microprocessor μC and in this way puts the microprocessor μC into an operating mode, until the microprocessor, after running a particular part of a program, is switched off again into the stop mode by software, in the course of which, via the output 10, the +5-Volt supply voltage at the output 11 of the supply arrangement 7 is turned off.

The output 26 of the inverter IC1 is followed by a feedback line 27, which via a diode D2 and a resistor R7 returns to the base 21 of the switch transistor T2. By means of this feedback line 27, it is assured that regardless of the duration of the switching signal of the key switches S1, S2, and thus also independently of any switch bounce, a switch pulse 25 having a specified, defined length is generated in each case, in that because of the feedback the switch transistor T2 remains conducting until the potential of the capacitor C1 at the input of the inverter IC1 has dropped below the switching threshold. Only then is the signal at the output of the inverter IC1 high again, and the switch transistor T2, with the keys S1, S2 opened, is returned to the nonconducting state, making it ready for a new switching event.

In the same way as via the keys S1, S2, the interrupt input $\overline{INT}$ from the microprocessor μC can also be activated by bus activity, in other words when a second station is sending a data telegram. In that case, a high signal appears at the control input 28 of the booting circuit arrangement 20, via the output 29 of the bus driver/receiver circuit arrangement 17, which signal is fed, via the diode D1, to the collector 22 of the switch transistor T2 or to the input of the timing stage, which here is formed by the capacitor C1, the resistors R6 and R8, the diode D3 and the inverter IC1. For the period of time defined by the capacitance of the capacitor C1, the size of the resistor R8 and the switching threshold of the inverter IC1, this timing stage applies a low signal to the interrupt input $\overline{INT}$ of the microprocessor μC.

Figure 2:
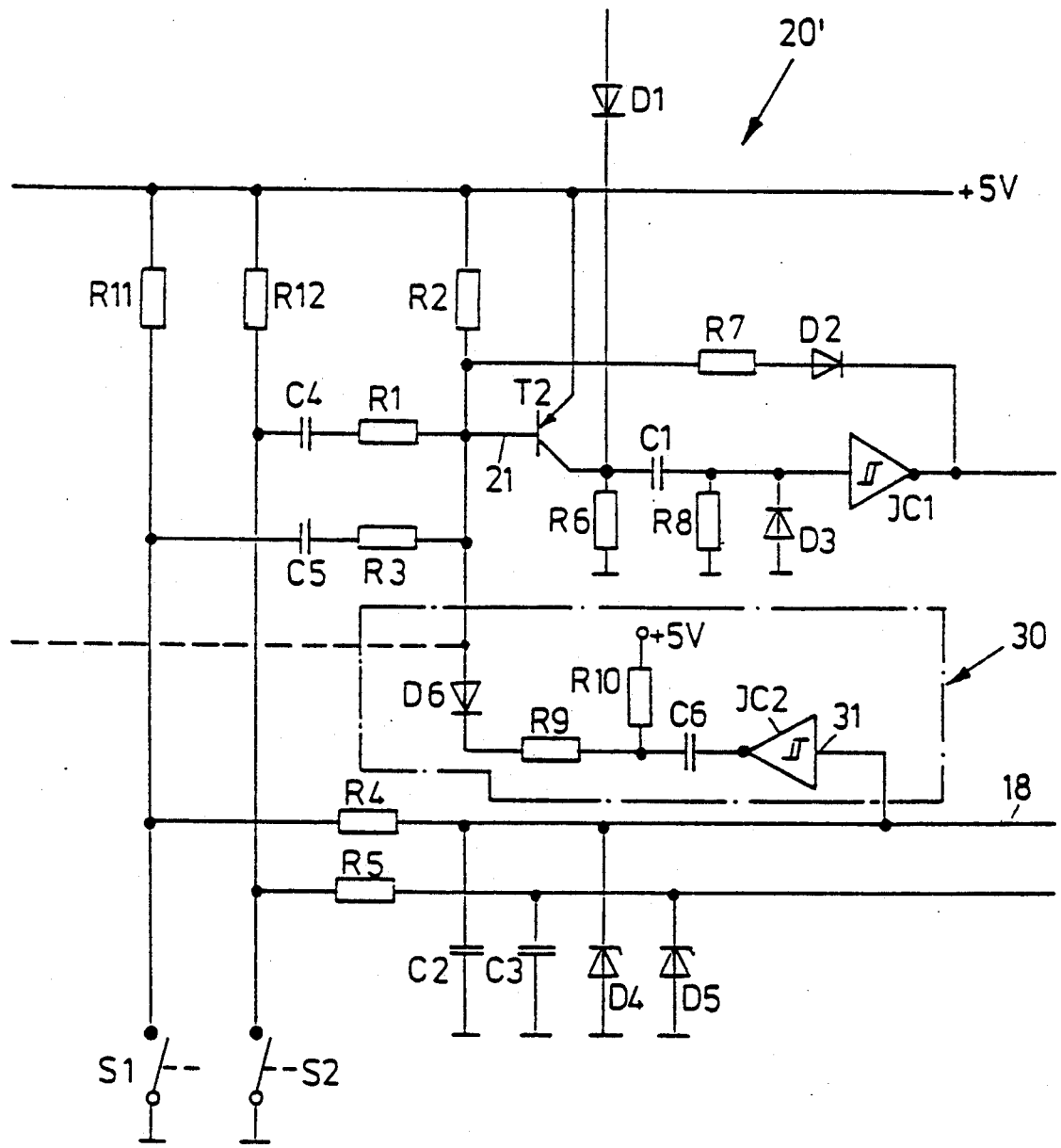

In the variant of the booting circuit 20' as shown in FIG. 2, each key S1, S2 is followed by a capacitor C4 and C5, respectively, which in turn is connected to the resistors R1 and R3, respectively, which are located at the base 21 of the switch transistor T2. The respective capacitors C4 and C5 are connected, on the side of the key switches S1, S2 via resistors R11 and R12, respectively, to +5 Volt of operating voltage of the output 12 of the voltage supply arrangement 7.

The capacitors C4 and C5 accordingly form differentiation elements, so that no voltage making the switch transistor T2 conductive is present at its base 21 as long as the voltage conditions on the input side do not vary. Only during the period of recharging of the capacitors C4 and C5 is the switch transistor T2 made conducting, because of the voltage drop across the resistors R1 and R3.

As a result, actuation of the key S2, for instance, in accordance with a contact of an alarm system in a motor vehicle, for instance, causes the switch transistor T2 to be made conducting and the microprocessor μC to be activated via the interrupt input $\overline{INT}$ even when the other key switch S1, which is for instance associated with the central locking system is closed over a long period of time. In other words, although the switch transistor T2 can be made conducting by the closure of the key or switch S1, as long as the capacitor C5 is recharged because of the voltage change dictated by the switching event, after an equilibrium state is attained with the switch S1 switched permanently on, current no longer flows across R3 in that case, so that voltage no longer drops across the base of the switch transistor T2 and reopens it. The embodiment of the switch signal 25 at the interrupt input $\overline{INT}$ of the microprocessor μC is effected in the same way as described in conjunction with FIG. 1.

For some applications it is desirable for the microprocessor μC to be activated not only when a key S1 or S2 is turned on but also when it is turned off, for instance when the central locking system is opened and thus when the key switch S1 is opened. A circuit arrangement 30 is provided for this purpose. For this key switch S1 or S2 that is to activate the microprocessor μC upon being turned off, one such circuit arrangement 30 each is necessary. In the exemplary embodiment shown in FIG. 2, it is provided only for the key S1. Correspondingly, branching off after the resistor R4, an inverter IC2 and a following capacitor C6 are connected in the line, leading to the usual read-in input 18, for the key switch S1, the capacitor C6 being followed by a resistor R9 and a diode D6; the output of the diode D6 on the anode side is carried to the base 21 of the switch transistor T2. A resistor R10 that is connected to positive potential is connected between the capacitor C6 and the resistor R9.

As a result of this circuit arrangement, the capacitor C6 is discharged as long as the key S1 is closed. Upon the opening of S1, the output of IC2 becomes low, and the switch transistor T2 is made conducting by the charging current of the capacitor C6 via D6 and R9, and it blocks again after the decay of this current. This decay time is dimensioned to be long enough that in each case a signal 25 of adequate length can be generated at the interrupt input $\overline{\text{INT}}$ of the microprocessor μC. Accordingly, a low signal is present at the input 31 of the inverter IC2 as long as the key S1 is closed. Upon opening of the key S1, a high signal is present via the resistor R11, and this signal is inverted by the inverter IC2, causing recharging of the capacitor C6, which leads to a voltage drop, which as described makes the switch transistor T2 conducting.

I claim:

1. A booting circuit arrangement for a microprocessor controlling peripheral electrical device (5,6) in a motor vehicle, wherein
    the microprocessor has an idling mode and an operating mode, and an interrupt input;
    the microprocessor can be put into the idling or stop mode and, from this stop mode, can be put into its operating mode by an external control signal (S1, S2) for the duration of running of existing programs,
    and further comprising
    an electronic booting circuit operatively coupled to the microprocessor;
    means responsive to the external control signal (S1, S2) for actuating the electronic booting circuit, said actuating means including a timing stage (C1, R8), said timing stage responding to said external control signal by generating, and applying to said interrupt input, a pulse (25) of predefined length, and
    means in said microprocessor for responding to said interrupt input pulse (25) by switchover into operating mode and by turning on (10) of voltage supply (7) to said peripheral electrical devices (5,6).

2. The circuit arrangement of claim 1, characterized in in the timing stage (C1, R8), positive voltage pulses are fed to a capacitor (C1), connected in series with which is a resistor (R8) connected to ground, and at the connection with which a diode (D3) connected in blocking direction to ground and the input of a threshold value switch (IC1) are connected, which switch is followed by the interrupt input ($\overline{\text{INT}}$) of the microprocessor (μC).

3. The circuit arrangement of claim 2, characterized in that the capacitor (C1), resistor (R8), diode (D3) and an inverter (IC1) follow the collector of a switch transistor (T2); that the switching signals are applied to the base of the switch transistor (T2); and that the output (26) of the threshold value switch, is connected to the base of the transistor (T2) via a feedback line (27) with a diode (D2) connected in the forward direction.

4. The circuit arrangement of claim 3, characterized in that disposed between the base of the switch transistor (T2) and at least one switch (S1 or S2) are a capacitor (C4 or C5, respectively) and a resistor (R1 or R3, respectively), connected in series with it.

5. The circuit arrangement of claim 3, characterized in that at least one of the switches (S1) is connected to positive potential via a further threshold value switch (IC2), a following capacitor (C6) and a following resistor (R10), and is connected to the base of the switch transistor (T2) via a further resistor (R9) and a diode (D6) connected in the blocking direction.

6. The circuit arrangement of claim 1, wherein a multiplex data line having a plurality of microprocessors and connecting stations is connected to at least one bus driver/receiver arrangement, characterized in that the driver/receiver arrangement (17) is connected to the timing stage (C1, R8) via a control input (28) of the booting circuit (20, 20') and a diode (D1).

* * * * *